C. M. BLACKFORD.
EYEGLASSES.
APPLICATION FILED JAN. 24, 1912.
1,063,499.
Patented June 3, 1913.
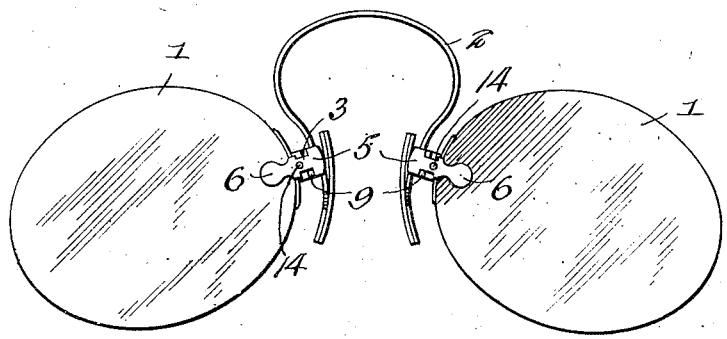
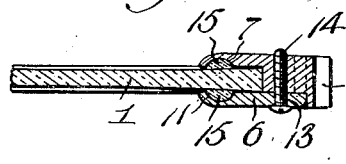
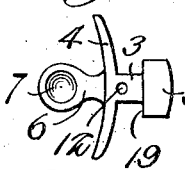
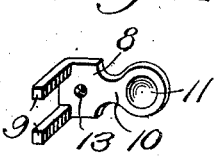
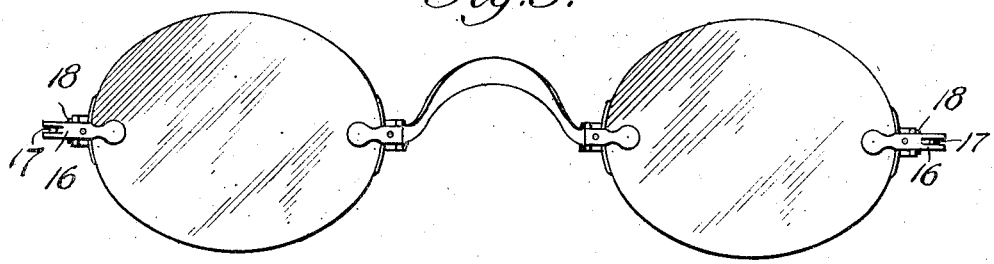
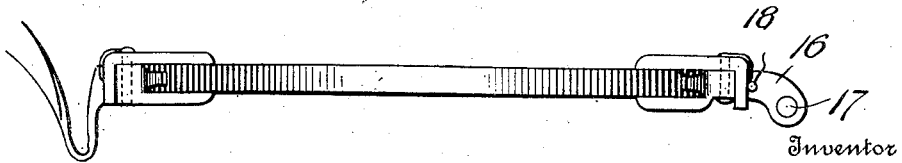
Witnesses
Inventor
Charles M. Blackford
By Victor J. Evans
Attorney

UNITED STATES PATENT OFFICE.

CHARLES M. BLACKFORD, OF TRENTON, NEW JERSEY.

EYEGLASSES.

1,063,499.  Specification of Letters Patent.  Patented June 3, 1913.

Application filed January 24, 1912. Serial No. 673,037.

*To all whom it may concern:*

Be it known that I, CHARLES M. BLACKFORD, a citizen of the United States, residing at Trenton, in the county of Mercer and State of New Jersey, have invented new and useful Improvements in Eyeglasses, of which the following is a specification.

This invention relates to eye glasses, spectacles and the like, and the object in view is to provide convenient and practical means for fastening each lens in the mounting in such a manner as to avoid weakening the lens in the slightest degree. The particular means for fastening the lens to the mounting not only retains the entire strength of the lens as well as the mounting but facilities the removal of the lens and the replacement of another lens. The expedient hereinafter particularly described also enables the most fragile or delicate lenses to be secured to the mounting as well as the heaviest lenses now on the market.

With the above and other objects in view, the invention consists in the construction, combination and arrangement of parts, set forth in and falling within the scope of the appended claims.

In the drawing:—Figure 1 is a view in elevation of a pair of eye glasses with the present invention applied thereto. Fig. 2 is an enlarged detail horizontal section, showing the means for fastening the lens in the mounting. Fig. 3 is a detail elevation of one member of the mounting. Fig. 4 is a detail perspective view of the complemental member of the mounting. Fig. 5 is a view of the invention applied to spectacles. Fig. 6 is a top edge view of the same.

Referring to the drawings, 1 designates a pair of lenses connected by a bridge 2 of the ordinary form. Each of the mountings comprises a main member consisting of a shank 3 at one side of which there is located the usual curved brace 4 against which the contiguous ends of the lens bear for a support, while at the opposite end of the shank is a lug 5 provided with an opening to receive the adjacent end of the bridge 2. Projecting inward from the brace 4 is an ear 6 having formed in its inner face a semi-spherical socket 7. The complemental member of the mounting embodies a shank 8 from one side of which project angular parallel arms 9 adapted to embrace the shank 3 of the first described member while at the opposite end of the shank 8 is a projecting ear 10 having a circular end portion formed in its inner face with a semispherical socket 11. The shank of one of said members is provided with a hole 12 and the shank of the other member is provided with a threaded opening 13 adapted to receive a clamping screw 14 by which the two members of the mounting are drawn together for the purpose of clamping the adjacent lens 1 securely between the same.

The lens 1 is provided in opposite sides thereof with semi-spherical knobs 15 which are preferably formed of glass, although other material may be employed. These knobs may be secured to the opposite faces of the lens by a quick-setting cement and they are, of course, secured to the lens at the proper point to fit into the semi-spherical sockets 7 and 11 of the two members of the mounting in the manner clearly illustrated in Fig. 2, so that when the clamping screw 14 is tightened, the complemental members of the mounting will be brought into firm binding contact with the knobs 15. The same idea as applied to spectacles is illustrated in Figs. 5 and 6, where in addition to the mountings at the inner edges of the lenses, it will be seen that similar mountings are provided at the outer edges, the only difference being that the outer mountings are provided with ears 16 to receive the pivots 17 of the usual bows, not shown, which pass back over the ears of the user. Furthermore, an ordinary pin 18 projecting on opposite sides of the ear 16 may be used in lieu of the shoulder 19 formed by the inner face of the lug 5 which receives the bridge 2. In either case, the spaced arms 9 of the complemental member of the mounting will slide and rest against the shoulder which consists of a pin 18, as shown in Fig. 3.

I claim:—

1. In a device of the class specified, the combination with a lens, of a semi-spherical knob permanently cemented on the surface thereof and projecting therefrom, and a detachable mounting embodying a socketed portion and means for mechanically retaining the same in relation to said knob and permitting separation between the knob and mounting.

2. In a device of the class described, the combination with a lens, of semispherical knobs permanently cemented on opposite sides thereof and projecting therefrom, and a mounting separable therefrom and embodying relatively movable clamping members provided with oppositely lying socketed portions to receive the knobs on the lens, and means for mechanically retaining the members of the mounting in fixed relation to said knobs.

3. The combination with a lens having permanently attached knobs projecting from the opposite sides thereof, of a mounting for the purpose specified, embodying two lens-engaging members socketed to receive said knobs one of which members comprises a lens brace, a bridge seat, and a shank connecting the brace and seat, the other member having spaced angular arms which straddle said shank, and a fastener inserted through both members between the lens brace and bridge seat.

In testimony whereof I affix my signature in presence of two witnesses.

CHARLES M. BLACKFORD.

Witnesses:
   GEORGE W. FORMAN,
   WILLIAM E. BLACKMAN.